United States Patent
Singer et al.

(10) Patent No.: US 6,196,170 B1
(45) Date of Patent: Mar. 6, 2001

(54) DRIVING DEVICE FOR A LAWN TRIMMER

(75) Inventors: Andreas Singer, Fraureuth; Torsten Haussner; Jochen Schoenhaar, both of Hamburg, all of (DE)

(73) Assignee: Dolmar GmbH, Hamburg (DE)

( * ) Notice: Subject to any disclaimer, the term of this patent is extended or adjusted under 35 U.S.C. 154(b) by 0 days.

(21) Appl. No.: 09/331,781

(22) PCT Filed: Dec. 18, 1997

(86) PCT No.: PCT/EP97/07101

§ 371 Date: Jun. 25, 1999

§ 102(e) Date: Jun. 25, 1999

(87) PCT Pub. No.: WO98/29651

PCT Pub. Date: Jul. 9, 1998

(30) Foreign Application Priority Data

Dec. 27, 1996 (DE) ................................. 196 54 290

(51) Int. Cl.[7] ............................................. F01P 1/02
(52) U.S. Cl. ............................ 123/41.56; 123/41.7
(58) Field of Search ...................... 123/41.56, 41.65, 123/41.7

(56) References Cited

U.S. PATENT DOCUMENTS

| 3,669,082 | * | 6/1972 | Hatz | 123/41.7 |
| 4,759,128 | | 7/1988 | Katoh et al. | 30/276 |
| 4,779,581 | | 10/1988 | Maier | 123/73 A |
| 4,790,270 | | 12/1988 | McKay et al. | |
| 5,233,952 | | 8/1993 | Isaka | |

FOREIGN PATENT DOCUMENTS

| 11 57 438 | 11/1963 | (DE) . |
| 30 23 628 | 1/1981 | (DE) . |
| 36 29 039 A1 | 3/1988 | (DE) . |
| 37 35 711 A1 | 5/1989 | (DE) . |
| 38 08 635 A1 | 9/1989 | (DE) . |
| 296 06 668 U 1 | 6/1996 | (DE) ................. F02N/63/02 |
| 0 428 186 A1 | 5/1991 | (EP) ................. F02B/63/02 |
| 0 590 362 A1 | 4/1994 | (EP) . |
| 0 661 431 A2 | 7/1995 | (EP) ................. F02D/41/14 |
| 1390894 | * 4/1975 | (GB) . |
| 52-59219 | 5/1977 | (JP) . |
| 8-093599 | 4/1996 | (JP) . |

* cited by examiner

Primary Examiner—Noah P. Kamen
(74) Attorney, Agent, or Firm—McCormick, Paulding & Huber LLP

(57) ABSTRACT

The invention refers to a driving apparatus for a lawn trimmer with a two-stroke motor having an injection valve, a coupling power output, air intake and exhaust gas discharge devices and a fuel pump as well as other possible additional components. For providing a compact construction and for guaranteeing the operativeness of the motor by fuel cooling and specific air guiding, the injection valve and a cooling air fan are placed on the same side of the motor cylinder block as the output coupling with the injection valve having a nozzle jet orientation directed to the ignition plug.

4 Claims, 1 Drawing Sheet

DRIVING DEVICE FOR A LAWN TRIMMER

BACKGROUND OF THE INVENTION

1. Technical Field

The invention refers to a driving device for a lawn trimmer with a two-stroke motor having an injection valve, a coupling, air intake and air blow-off devices and a fuel pump as well as eventual further additional aggregates.

2. Prior art

For a driving device known from EP-A-0428 186, the lawn trimmer driving gear is aligned in such a way that the crankshaft axis is placed in a straight line with the main shaft or the main pipe, thus with the drift. A fan driven by the crankshaft (fan wheel) feeds cooling air, mostly sucked below the crankcase, to the cylinder block, whereby the cooling air discharges above a separating plane lying at the level of the cylinder base over the motor unit which has lamellar type walls which should effect an appropriate air guiding with optimal cooling. This known lawn trimmer is provided with a carburetor.

Since lawn trimmers are hand-operated portable implements, a compact, light construction with a weight as low as possible, which makes an optimal cooling or air guiding difficult, is aimed at. The operativeness of the motor decisively depends on a thermally controlled air guiding.

For a chain saw known from DE-U-296 06 668, an injection installation is provided for.

SUMMARY OF THE INVENTION

The aim of the present invention is to indicate, for the driving device mentioned at the beginning, a new compact construction which guarantees the operativeness by using an injection system, and which represents a functional arrangement for a special kind of motor scythes, namely the trimmers.

This aim is reached by the driving device described in claim 1. Hereby, it is provided for that the injection valve is placed on the coupling side with a nozzle jet orientation directed in direction of the ignition plug or of the cylinder head. Moreover, the coupling and a fan (fan wheel) are placed axially side by side on the crankshaft on the side on which the driven shaft is placed. The injection valve is then placed above the fan wheel of the fan casing. Thus, we obtain that the cooling air conveyed by the fan wheel can cool the injection valve and the fuel supply line connected herewith before the cylinder block is flown around. For the further optimization, the invention provides for that the injection valve penetrates an air guiding wall of the two-stroke motor unit. This arrangement brings the following advantages: on the one hand, there is a relatively big free construction space on the coupling side so that the arrangement of the injection valve allows for a compact outer casing form. Further advantages consist in the cooling of the valve as well as of the fuel supply system and in the arrangement of the valve or of the fuel supply system to the directed air guiding/air transmission to other hot places on the cylinder with a great cooling air requirement.

As it has already been proposed in a previous application of the applicant, the injection valve should be connected to an electronic control unit which is placed, according to a configuration of the invention, on the side opposite to the coupling side, preferably near a tank placed under the crankcase. This measure also is useful for a compact construction as well as for the providing of short connecting lines to sensors in the intake casing and finally for a cooling by the continously flowing fresh intake air. A further advantage of this arrangement of the control unit consists in the simple accessibility for maintenance operations.

Further developments of the driving device are described in the subclaims.

According to another embodiment of the invention, the nozzle opening of the injection valve is preferably placed above or in the upper area of a transfer passage.

Preferably, the fuel pump is directly driven by the crankshaft, whereby an optimal place for the fuel pump exists between the crankcase placed under the two-stroke motor cylinder block and the fan casing. Thus, the fuel pump is effectively cooled by the cooling air sucked by the fan wheel. Furthermore, this arrangement creates relatively short distances between the fuel supply pipes and the injection valve.

The starter casing is placed on the drive side between the coupling casing and the fan casing.

DETAILED DESCRIPTION OF THE PREFERRED EMBODIMENTS

Figure 1:
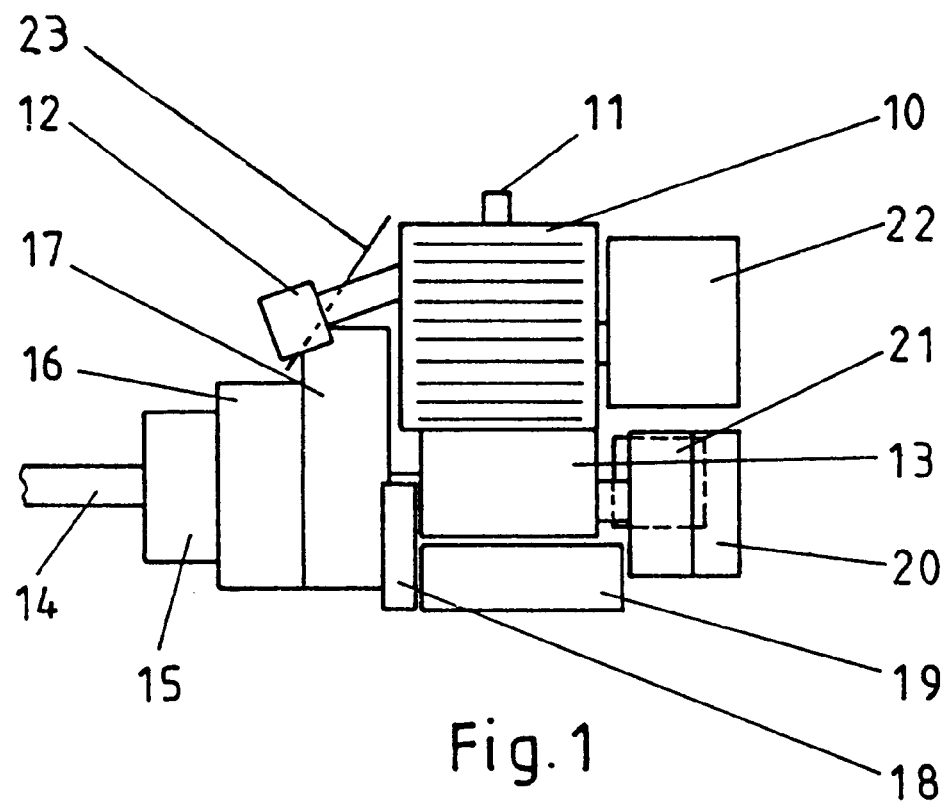
FIG. 1 shows a schematic lateral view of a driving device according to the invention.
Figure 2:
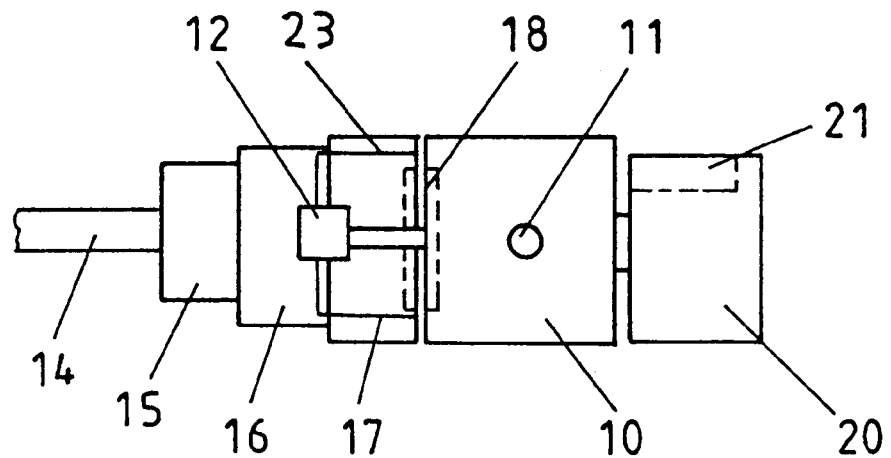
FIG. 2 is a top view of this driving device.

The essential parts of the driving device are the cylinder 10 or the motor/cylinder block with an ignition plug 11 and a crankcase 13 which is placed under the cylinder 10. The crankshaft 14 projects from this crankcase as a driven shaft on which a coupling casing 15, a starter casing 16 and a fan casing 17 are placed. The fan casing 17 with the cooling air conveying fan wheel is placed besides and under the cylinder 10. A fuel pump 18, which is also driven by the crankshaft, is placed between the crankcase 13 and the fan casing 17, fuel pump which conveys the fuel, which is in the tank 19 placed under the crankcase 13, to the injection valve 12 over non-represented fuel supply pipes. The intake casing 20 and a control unit 21 connected hereto as well as an exhaust above it are provided for on the side of the cylinder which is opposite the drift.

The arrangement of the injection valve 12 on the drive side, i.e. above the fan 17, has the advantage that the overall height predetermined by the cylinder upper edge according to the inclination of the injection valve must not be exceeded. The further advantage of the arrangement of the fan 17 relative to the injection valve 12 as well as to the fuel pump 18 consists in the fact that these parts are cooled by the sucked air besides the motor unit. The same appilies to the control unit 21, the heating of which can be efficiently avoided by the arrangement in or on the intake casing 20.

List Of Reference Numerals

Cylinder 10
Ignition plug 11
Injection valve 12
Crankcase 13
Crankshaft 14
Coupling casing 15
Starter casing 16
Fan casing 17
Fuel pump 18
Tank 19
Intake casing 20

Control unit 21
Exhaust 22
Air guiding wall 23

What is claimed is:

1. A driving apparatus for a lawn trimmer, said apparatus comprising:

a two-stroke motor having an injection valve (12), an output coupling (15) for connection to a driven shaft (14), air intake and exhaust gas discharge devices (20, 22), a fuel pump (18), a cooling air fan wheel (17), a crankshaft, a cylinder block (10) having an upper portion extending above the fan wheel, an ignition plug (11) in the upper portion of the cylinder block, and an air guiding wall extending above the fan wheel for directing air conveyed by the fan wheel onto the upper portion of the cylinder block, the coupling (15) and the fan wheel (17) are placed on the crankshaft on the same side of the cylinder block (10) as the driven shaft (14), the injection valve (12) is mounted on the cylinder block on the same side of the cylinder block as the coupling (15) and fan wheel (17) with a jet orientation directed toward the ignition plug (11), the injection valve (12) penetrating the air guiding wall so that the air conveyed by the fan wheel (17) also serves for the cooling of the injection valve (12) and of a fuel supply line connected to the injection valve, the injection valve (12) being connected to an electronic control unit (21) which is placed on the side of the cylinder block opposite to the output coupling (15).

2. A driving device according to claim 1 wherein:

the nozzle opening of the injection valve (12) is placed above or in the upper area of a transfer passage.

3. A driving device according to claim 1 wherein:

the fuel pump (18) is directly driven by the crankshaft and is located between a crankcase (19) placed under the cylinder block (10) and the fan wheel (17).

4. A driving device according to claim 1 wherein:

a starter (16) is placed between the coupling (15) and the fan wheel (17).

* * * * *